United States Patent Office 2,744,076
Patented May 1, 1956

2,744,076

PRODUCTION OF ORGANOPLASTICS IN CELLULAR FORM BY MEANS OF CHEMICAL BLOWING AGENTS

Frederick W. Breuer, Lititz, and Leo L. Tolman, Lancaster Township, Lancaster County, Pa., assignors to Armstrong Cork Company, Lancaster, Pa., a corporation of Pennsylvania No Drawing. Application April 14, 1951,
Serial No. 221,132

13 Claims. (Cl. 260—2.5)

This invention relates to the production of organoplastics in cellular form involving the utilization of novel chemical blowing agents capable of evolving substantial quantities of nitrogen gas upon heating a mixture of the rubber or plastic and the chemical blowing agent.

Chemical blowing agents have been used for a considerable period of time for expanding plastics, such as rubber or various resinous compositions. Sodium bicarbonate is a very well-known chemical blowing agent, but this material does not always give a uniform cell structure. In addition, comparatively large quantities of the material must be employed in order to obtain the desired expansion of the rubber or plastic mass.

It has also been proposed to use a number of organic chemical compounds as blowing agents for rubbers and plastics. Urea has been used but is unsuitable under moisture conditions. 2,5-dimethyl-2,5-dicyano-3,4-diazohexane has been suggested as a blowing agent, but such material is quite expensive, and the products formed upon its decomposition are toxic. The resulting expanded rubber is also characterized by an unpleasant odor. Diazoaminobenzene has been used as a chemical blowing agent, but the resulting product is somewhat undesirable because the particular blowing agent causes blooming. Additional disadvantages of such material are that the by-products formed on decomposition during blowing, such as aniline, are toxic; the blowing agent causes decided discoloring of the product; and the aging properties of the expanded product are not very satisfactory.

Other selected nitrogen compounds have been proposed; for example, di-N-nitroso pentamethylene tetramine. However, the material itself is quite expensive, and substantial quantities of it are required to produce a uniformly blown product. In addition, with some rubber or plastic compounds, products of this type are rather difficult to disperse.

We have found that superior results may be obtained in the production of cellular organoplastics by using selected bis-nitroso compounds as chemical blowing agents. These selected bis-nitroso compounds are the diamino-N,N'-dinitroso-N,N'-di-[alpha alpha dialkyl gamma keto alkyl] alkanes. The preferred compounds are typified by the following structural formula:

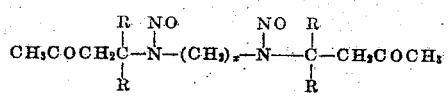

where R is an alkyl group containing 1 to 18 carbon atoms, and $x$ is an integer from 1 to 20.

By the term organoplastic, or its equivalent, we mean rubbers and plastics, and we intend to include natural rubber and synthetic rubberlike materials, such as synthetic rubbers obtained by polymerizing 2-chlorobutadiene-1:3, or butadiene-1:3 and styrene, or butadiene-1:3 and acrylonitrile, or butadiene-1:3 and methyl methacrylate, as well as isocyanate modified polyester amides, and similar products. We also intend to include synthetic resins, such as phenol-formaldehyde resins, urea-formaldehyde resins, alkyd resins, acrylic resins, vinyl resins, and the like.

The following compounds are typical of the selected bis-dinitroso compounds employed in the practice of our invention: 4,4,13,13-tetramethyl-N,N'-dinitroso-5,12-diaza-2,15-hexadecanedione; 4,4,11,11-tetramethyl-N,N'-dinitroso-5,10-diaza-2,13-tetradecanedione; 4,4,9,9-tetramethyl-N,N'-dinitroso-5,8-diaza-2,11-dodecanedione; and the like.

In accordance with our invention, the organoplastic material may be admixed with the chemical blowing agents and the resulting mixture heated to decompose the blowing agent with the evolution of nitrogen gas, which expands the plastic material. The expanded material is treated either simultaneously or subsequently or both to fix it permanently in its expanded condition.

It is to be understood that in the practice of our invention the organoplastic may be admixed with other components to form an organoplastic compound, which may be subjected to the blowing action of the selected agents to produce the desired cellular bodies. For example, a mixture of rubber or rubberlike material and finely divided filler such as cork, wood flour, and the like, may be prepared, and the resulting mix subjected to the action of the blowing agents employed in the practice of our invention to produce a filled sponged product.

In the case of rubberlike materials and if desired in the case of the resins or resinous compositions or plastic compositions, the conventional closed mold techniques may be employed. However, in the case of selected resinous materials, it has been found that the blowing agents may be employed in the open mold blowing of such compositions to produce a cellular material having highly desirable properties. The open mold blowing of selected compositions is disclosed and claimed in copending application Serial No. 221,130, filed April 14, 1951, by Conral C. Callis. A typical example of the preparation of the chemical blowing agents employed in the practice of our invention is illustrated by the following:

Example I

In a 500 ml. 3-necked flask provided with a stirrer and a dropping funnel was placed a solution of 11.6 grams (0.1 mole) of hexamethylene diamine in 30 ml. of water. 24½ grams (0.25 mole) of pure mesityl oxide (128.7° C.) was added dropwise, with constant stirring, over a period of 1 hour. The solution was then cooled in ice, and the mixture was neutralized with glacial acetic acid at such a rate that the temperature of the reaction mixture was kept below 5° C. 27.6 grams (0.4 mole) of sodium nitrite, 40 ml. of water and 20 ml. of glacial acetic acid were added consecutively and the mixture stirred for 2 hours. During this time, the reaction vessel was kept in ice for 1 hour and then in a water bath at 35° C. for an additional hour. The flask was then cooled in an ice-salt bath and 100 ml. of ice water was added. A light orange solid separated out immediately. It was filtered, washed several times with water, sucked dry, and dried overnight in a desiccator over anhydrous calcium chloride. Yield weight—36.5 g. (98%).

In accordance with our invention, an effective amount of the selected blowing agents or mixture of selected blowing agents is admixed with the material to be formed into a cellular product. While the amount of blowing agent to be used may vary, depending, among other things, upon the particular end use to which the product is put, in the manufacture of insulating materials, generally speaking, we find it advantageous to employ about 0.5% to about 30% by weight of the total composition of the selected blowing agents. Particularly advantageous results are obtained by utilizing about 10% to about 15% by weight of the blowing agents. When less than about 0.5% by weight of blowing agent is used, the quantity of gas emitted is insufficient to give the desirable cell size to the product. When more than 30% by weight of blowing agent is employed, the rate of expansion and cell size are too difficult to control. When a rubberlike product is desired, we may employ smaller quantities of blowing agents, such, for example, as 0.5% to about 3% by weight.

Ordinarily we obtain desirable products by heating the mixture of organoplastic and blowing agent at a temperature of about 225° F. to 350° F. for the period of about 5 minutes to 1 hour. However, such conditions may well be varied, depending upon the particular material to be sponged or expanded, the particular blowing agent employed, the temperature at which the expansion is conducted, and the like.

The following examples are given by way of illustration of our invention:

*Example II*

Three parts by weight of 4,4,13,13-tetramethyl-N,N'-dinitroso-5,12-diaza-2,15-hexadecanedione were mixed with 225 parts by weight of a composition containing 100 parts of a butadiene-styrene synthetic rubber and 50 parts of 10 to 50 mesh cork particles. The mixture was heated under pressure to a temperature of approximately 300° F. for about 1 hour. The resulting product was a sponged cork and rubber composition of medium pore size.

*Example III*

Five parts by weight of a vinyl polymer containing 86% vinyl chloride, 13% vinyl acetate, and 1% dicarboxylic acid were mixed with .9 part by weight of tricresyl phosphate plasticizer and 2 parts by weight of 4,4,13,13-tetramethyl-N,N'-dinitroso - 5,12 - diaza - 2,15-hexadecanedione. The resulting composition was heated at 270° F. at atmospheric pressure for about 15 minutes. The resulting product was a soft sponge product having medium pore sizes of 1/16" to 1/8".

*Example IV*

Five parts by weight of a vinyl resin which was a copolymer of vinyl chloride and vinyl acetate containing 87% vinyl chloride and 13% vinyl acetate were admixed with .9 part by weight of tricresyl phosphate plasticizer and 2 parts by weight of 4,4,13,13-tetramethyl-N,N'-dinitroso-5,12-diaza-2,15-hexadecanedione. The resulting mixture was heated at atmospheric pressure at a temperature of 270° F. for about 20 minutes to obtain a soft sponge product having a pore size of less than 1/64".

*Example V*

Five parts by weight of a vinyl chloride-vinyl acetate copolymer containing 87% vinyl chloride and 13% vinyl acetate were admixed with .9 part by weight diphenyl phosphate plasticizer and 1.6 parts by weight of 4,4,9,9-tetramethyl-N,N'-dinitroso-5,8-diaza-2,11 - dodecanedione and heated at atmospheric pressure at a temperature of 266° F. for a period of 20 minutes. The resulting product was a soft sponge having a pore size of at least 1/4".

The sponged or cellular products produced in accordance with our invention may be used as insulating material for both high and low temperature work. The nature of the products may, of course, be varied by the particular organoplastic or mixture of organoplastic used as a starting material as well as the conditions of expansion.

We claim:

1. A method of making a gas-expanded material which comprises admixing a compound of the group consisting of 4,4,13,13-tetramethyl-N,N'-dinitroso-5,12-diaza-2,15-hexadecanedione; 4,4,11,11-tetramethyl-N,N'-dinitroso-5,10-diaza-2,13-tetradecanedione; and 4,4,9,9-tetramethyl-N,N'-dinitroso-5,8-diaza-2,11-dodecanedione with an organoplastic of the group consisting of styrene polymers and vinyl chloride polymers and decomposing said compound by heat to evolve nitrogen and carbon dioxide and expand said organoplastic material.

2. The process of preparing organoplastic materials in sponge-like or cellular form comprising admixing a compound of the group consisting of 4,4,13,13-tetramethyl-N,N' - dinitroso - 5,12 - diaza - 2,15 - hexadecanedione; 4,4,11,11-tetramethyl-N,N'-dinitroso-5,10-diaza-2,13 - tetradecanedione; and 4,4,9,9-tetramethyl-N,N'-dinitroso-5,8-diaza-2,11-dodecanedione with an organoplastic of the group consisting of styrene polymers and vinyl chloride polymers and heating the resulting mixture at a temperature between about 225° F. and 350° F. to decompose said compound to evolve nitrogen and carbon dioxide and expand said organoplastic material.

3. A method of making a gas-expanded material which comprises admixing 4,4,13,13-tetramethyl-N,N'-dinitroso-5,12-diaza-2,15-hexadecanedione with an organoplastic of the group consisting of styrene polymers and vinyl chloride polymers and decomposing said hexadecanedione by heat to evolve nitrogen and carbon dioxide and expand said organoplastic material.

4. A method of making a gas-expanded material which comprises admixing 4,4,9,9-tetramethyl-N,N'-dinitroso-5,8-diaza-2,11-dodecanedione with an organoplastic of the group consisting of styrene polymers and vinyl chloride polymers and decomposing said dodecanedione by heat to evolve nitrogen and carbon dioxide and expand said organoplastic material.

5. A method of making a gas-expanded material which comprises admixing a compound of the group consisting of 4,4,13,13-tetramethyl-N,N'-dinitroso-5,12-diaza-2,15-hexadecanedione; 4,4,11,11-tetramethyl-N,N'-dinitroso-5,10-diaza-2,13-tetradecanedione; and 4,4,9,9-tetramethyl-N,N'-dinitroso-5,8-diaza-2,11-dodecanedione with polystyrene and decomposing said compound by heat to evolve nitrogen and carbon dioxide and to expand said polystyrene.

6. A method of making a gas-expanded material which comprises admixing a compound of the group consisting of 4,4,13,13-tetramethyl-N,N'-dinitroso-5,12-diaza-2,15 - hexadecanedione; 4,4,11,11 - tetramethyl - N,N'-dinitroso-5,10-diaza-2,13-tetradecanedione; and 4,4,9,9-tetramethyl - N,N' - dinitroso - 5,8 - diaza - 2,11 - dodecanedione with a vinyl chloride resin and decomposing said compound by heat to evolve nitrogen and carbon dioxide and to expand said vinyl chloride resin.

7. A composition of matter capable of yielding a gas-expanded material upon heating, said composition comprising an organoplastic of the group consisting of styrene polymers and vinyl chloride polymers and a compound of the group consisting of 4,4,13,13-tetramethyl-N,N'-dinitroso-5,12-diaza - 2,15 - hexadecanedione; 4,4,11,11-tetramethyl - N,N' - dinitroso - 5,10 - diaza - 2,13 - tetradecanedione; and 4,4,9,9 - tetramethyl - N,N' - dinitroso-5,8-diaza-2,11-dodecanedione.

8. A composition of matter capable of yielding a gas-expanded material upon heating, said composition comprising an organoplastic of the group consisting of styrene polymers and vinyl chloride polymers and 4,4,13,13-tetramethyl-N,N'-dinitroso-5,12-diaza-2,15-hexadecanedione.

9. A composition of matter capable of yielding a gas-expanded material upon heating, said composition comprising an organoplastic of the group consisting of styrene polymers and vinyl chloride polymers and 4,4,9,9-tetramethyl-N,N'-dinitroso-5,8-diaza-2,11-dodecanedione.

10. A composition of matter capable of yielding a gas-expanded material upon heating, said composition comprising polystyrene and a compound of the group consisting of 4,4,13,13 - tetramethyl - N,N' - dinitroso - 5,12-diaza - 2,15 - hexadecanedione; 4,4,11,11 - tetramethyl-N,N' - dinitroso - 5,10 - diaza - 2,13 - tetradecanedione; and 4,4,9,9 - tetramethyl - N,N' - dinitroso - 5,8 - diaza-2,11-dodecanedione.

11. A composition of matter capable of yielding a gas-expanded material upon heating, said composition comprising a vinyl chloride resin and a compound of the group consisting of 4,4,13,13-tetramethyl-N,N'- dinitroso - 5,12 - diaza - 2,15 - hexadecanedione; 4,4,11,11- tetramethyl - N,N' - dinitroso - 5,10 - diaza - 2,13 - tetradecanedione; and 4,4,9,9 - tetramethyl - N,N' - dinitroso-5,8-diaza-2,11-dodecanedione.

12. A composition of matter capable of yielding a gas-expanded material upon heating, said composition comprising an organoplastic of the group consisting of styrene polymers and vinyl chloride polymers and about 0.5% to about 30% by weight of a compound of the group consisting of 4,4,13,13-tetramethyl-N,N'-dinitroso-5,12 - diaza - 2,15 - hexadecanedione; 4,4,11,11 - tetramethyl - N,N' - dinitroso - 5,10 - diaza - 2,13 - tetradecanedione; and 4,4,9,9 - tetramethyl - N,N' - dinitroso-5,8-diaza-2,11-dodecanedione.

13. A composition of matter capable of yielding a gas-expanded material upon heating and containing an organoplastic of the group consisting of styrene polymers and vinyl chloride polymers and about 10% to about 15% by weight of a compound of the group consisting of 4,4,13,13 - tetramethyl - N,N' - dinitroso - 5,12-diaza-2,15 - hexadecanedione; 4,4,11,11 - tetramethyl - N,N'-dinitroso - 5,10 - diaza - 2,13 - tetradecanedione; and 4,4,9,9 - tetramethyl - N,N' - dinitroso - 5,8 - diaza - 2,11-dodecanedione.

References Cited in the file of this patent
UNITED STATES PATENTS 2,491,709  Briggs et al. _____ Dec. 20, 1949

OTHER REFERENCES

Jones et al.: Journal of the Chem. Soc. (London), 1933, pages 363–370.

Unicel ND Report No. 47–3, May 1947, 4 pages, published by Rubber Chem. Division, Du Pont.